United States Patent
Lim et al.

(10) Patent No.: US 9,648,261 B2
(45) Date of Patent: May 9, 2017

(54) ACCOUNT FOR CLIPPED PIXELS IN AUTO-FOCUS STATISTICS COLLECTION

(71) Applicant: Apple Inc., Cupertino, CA (US)

(72) Inventors: Suk Hwan Lim, Mountain View, CA (US); David R. Pope, Cupertino, CA (US); Touraj Tajbakhsh, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 14/836,918

(22) Filed: Aug. 26, 2015

(65) Prior Publication Data
US 2017/0064232 A1   Mar. 2, 2017

(51) Int. Cl.
| | |
|---|---|
| *H04N 5/367* | (2011.01) |
| *H04N 5/357* | (2011.01) |
| *H04N 5/232* | (2006.01) |
| *H04N 9/04* | (2006.01) |
| *G06T 5/20* | (2006.01) |

(52) U.S. Cl.
CPC ............ *H04N 5/3675* (2013.01); *G06T 5/20* (2013.01); *H04N 5/23212* (2013.01); *H04N 5/357* (2013.01); *H04N 9/045* (2013.01)

(58) Field of Classification Search
CPC .. H04N 5/3675; H04N 5/23212; H04N 5/357; H04N 5/367; H04N 5/3696; H04N 5/142; H04N 5/347; H04N 1/4092; H04N 9/045; G06T 5/20; G06T 5/002; G06T 7/0085; G06T 2207/20192; G06T 2207/20032; G06T 2207/20012; G03B 13/36
See application file for complete search history.

(56) References Cited

U.S. PATENT DOCUMENTS

| | | | |
|---|---|---|---|
| 7,327,504 B2 | 2/2008 | Gallagher | |
| 7,667,765 B2 | 2/2010 | Turley et al. | |
| 8,085,322 B2 * | 12/2011 | Seki | H04N 5/367 |
| | | | 348/246 |
| 8,466,976 B2 | 6/2013 | Morales | |
| 8,531,379 B2 | 9/2013 | Kerofsky | |
| 8,804,027 B2 * | 8/2014 | Ichimiya | H04N 5/23212 |
| | | | 348/349 |
| 8,947,554 B2 * | 2/2015 | Kitajima | H04N 5/142 |
| | | | 348/223.1 |
| 8,953,882 B2 | 2/2015 | Lim et al. | |
| 9,025,074 B2 * | 5/2015 | Kishi | H04N 5/23212 |
| | | | 348/222.1 |

(Continued)

*Primary Examiner* — Michael Osinski
(74) *Attorney, Agent, or Firm* — Robert C. Kowert; Meyertons, Hood, Kivlin, Kowert & Goetzel, P.C.

(57) ABSTRACT

An image processing pipeline may account for clipped pixels in auto focus statistics. Generating auto focus statistics may include evaluating a neighborhood of pixels with respect to a given pixel in a stream of pixels for an image. If a clipped pixel is identified within the neighborhood of pixels then the evaluation of the given pixel may be excluded from an auto focus statistic. The image processing pipeline may also provide auto focus statistics that do not exclude clipped pixels. A luminance edge detection value may, in some embodiments, be generated by applying an IIR filter to the given pixel in a stream of pixels to band-pass filter the given pixel before including the band-pass filtered pixel in the generation of the luminance edge detection value.

20 Claims, 8 Drawing Sheets

(56) References Cited

U.S. PATENT DOCUMENTS

| | | | |
|---|---|---|---|
| 9,031,319 B2 | 5/2015 | Cote et al. | |
| 9,100,635 B2* | 8/2015 | Duparre | H04N 17/002 |
| 9,219,870 B1* | 12/2015 | Mills | H04N 5/2628 |
| 9,294,688 B2* | 3/2016 | Ju | H04N 5/243 |
| 2003/0146975 A1* | 8/2003 | Joung | H04N 5/3675 348/164 |
| 2005/0093992 A1* | 5/2005 | Fukumoto | G06T 7/408 348/222.1 |
| 2005/0219390 A1* | 10/2005 | Tajima | H04N 9/045 348/246 |
| 2005/0249430 A1* | 11/2005 | Lim | G06T 7/0091 382/266 |
| 2007/0242897 A1* | 10/2007 | Bushell | G06T 5/006 382/274 |
| 2008/0100727 A1* | 5/2008 | Seki | H04N 5/367 348/246 |
| 2010/0073527 A1* | 3/2010 | Ichimiya | H04N 5/367 348/247 |
| 2010/0098348 A1* | 4/2010 | Zhang | G06T 5/002 382/262 |
| 2011/0102624 A1* | 5/2011 | Hashizume | H04N 5/3675 348/222.1 |
| 2012/0154646 A1* | 6/2012 | Sai | H04N 5/367 348/246 |
| 2012/0176532 A1* | 7/2012 | Hara | G03B 13/36 348/352 |
| 2013/0229550 A1* | 9/2013 | Nakao | H04N 5/367 348/247 |
| 2013/0258145 A1* | 10/2013 | Nakaseko | H04N 5/357 348/246 |
| 2014/0002675 A1* | 1/2014 | Duparre | H04N 17/002 348/187 |
| 2014/0192249 A1* | 7/2014 | Kishi | H04N 5/23212 348/349 |
| 2014/0334742 A1* | 11/2014 | Gohshi | G06T 5/003 382/266 |
| 2015/0256760 A1* | 9/2015 | Ju | H04N 9/045 348/256 |
| 2016/0221778 A1* | 8/2016 | Ueda | B65H 7/14 |

* cited by examiner

ACCOUNT FOR CLIPPED PIXELS IN AUTO-FOCUS STATISTICS COLLECTION

BACKGROUND

Image data captured by an image sensor is often initially processed as part of an image processing pipeline in order to prepare the captured image data for further processing or consumption. In this way, real-time corrections or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Given the ubiquity of image sensors in many different products, efficiently handling image data as part of an image processing pipeline may confer relief on those products with constrained resources for performing additional tasks.

SUMMARY

An image signal processor of a device, apparatus, or computing system that includes a camera or other image sensor capable of capturing image data may, in some embodiments, be configured to account for clipped pixels in auto focus statistics. Automated image sensor controls may perform many different image sensor adjustments to modify an image that is captured by a sensor, such as automated focal adjustments. Statistics that enable automated focal adjustments to be determined may be collected when processing an image captured by the image sensor. When generating some auto focus statistics, a clipped pixel may be identified within a neighborhood of pixels being evaluated to generate the auto focus statistic. The evaluation of the neighborhood of pixels including the clipped pixel may be excluded from the generation of the auto focus statistics.

Figure 1:
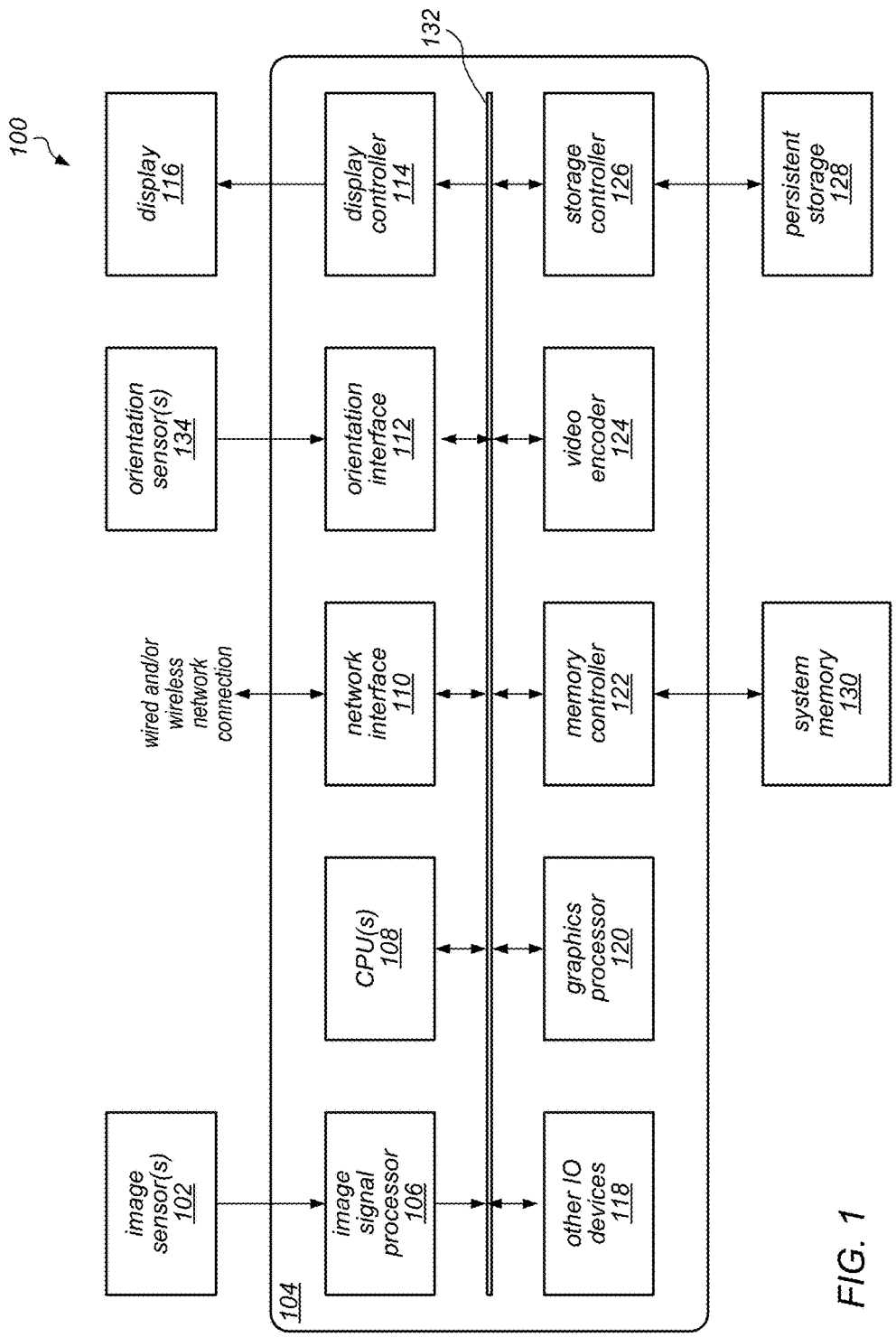
FIG. 1 is a logical block diagram illustrating an example system that may implement an image processing pipeline that accounts for clipped pixels in auto focus statistics collection, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An image signal processor or other image processing pipeline may implement many different techniques or components to account for clipped pixels in auto focus statistics.

Image sensor controls may perform many different image sensor adjustments to modify an image that is captured by a sensor. For instance, automated focus adjustments may be performed to change the point of focus for an image that is captured by the image sensor. In order to perform the sensor adjustments, statistics may be collected which may be utilized by an image sensor controller (or other module or component that controls the image sensor) to determine the particular adjustments. In the case of automated focus (referred to herein as "auto focus"), various image statistics may be generated by an image signal processor or other image processing pipeline that processes image data collected by the image sensor in order to determine focal adjustments (e.g., increases or decreases to focal length to an image sensor) to be automatically performed at the image sensor. Thus, auto focus statistics may be statistics which indicate or characterize the focus of an image. For instance, edge counts, sharp edges, and other edge detection values may be collected as auto focus statistics for an image. Collecting these auto focus statistics upon image data that is received at the image processing pipeline from the image sensor may allow for real-time focal adjustments to be made to the image sensor without manual input.

Focal adjustments determined according to various auto focus techniques may utilize collected auto focus statistics to identify characteristics of various portions of an image. Consider auto focus techniques that direct focus of an image sensor to a sharp portion of an image. An image captured by the image sensor may include object(s) further in distance with respect to the image sensor that are captured with fuzzier (less sharp) lines as compared to other object(s) closer to the image sensor, which may have more clear and distinct lines (more sharp). The auto focus techniques performed may determine focal length adjustments to be made at the image sensor that increase the focus of the image sensor upon the sharper object(s) in order to increase the image detail captured for those sharper object(s).

In some scenarios, auto focus statistics may provide misleading or inconsistent information to an image sensor control or other component making auto focus determinations. Consider a scenario where objects further from an image sensor include some bright objects and some dark objects (e.g., Christmas tree lights on a Christmas tree where the lights contrast with the darker tree portions). Even though these bright and dark objects may be distant with respect to other objects in an image (e.g., persons posed in front of the Christmas tree), an evaluation of the image may generate auto focus statistics indicating that the more distant objects are sharper than the other closer objects. An auto focus technique, like the example given above, that makes focal adjustments by identifying sharp portions of an image may wrongly characterize the further objects as sharper than the closer other objects (which may actually be sharper in terms of detail). Conditions, such as the example given above, are sometimes referred to as specular lighting scenarios.

In image processing, clipped pixels may be pixels with values (e.g., color channel values, luminance channel values, or some other value or characteristic which the image sensor may collect) that are beyond visual perception, display capability, or other processing limitation. For instance, clipped pixel values may appear as white portions of a captured image where high color values of pixel are displayed as white (even though the object in reality is not white). When evaluating an image to collect auto focus statistics, clipped pixels may be indicative of those scenarios that generate misleading or inconsistent auto focus statistics and lead to the generation of the misleading or inconsistent auto focus statistics. Thus, in various embodiments, the image processing pipeline may perform various techniques that account for clipped pixels when generating auto focus statistics.

In various embodiments, auto focus statistics may be generated according to the image data received from an image sensor and evaluated according to different techniques. For instance, in some embodiments a stream of pixel data may be evaluated to detect sharp portions of an image according to various color channels or components in the pixel data collected for an image. Different evaluation techniques, such as the application of various digital filters may be used to calculate corresponding pixel values which indicate the sharp portions of an image. For instance, an edge detection value may be generated which indicates those portions of an image that include more discernable edges, and thus may be sharper portions of an image.

When applying the digital filters, in various embodiments, a neighborhood of pixels near to a pixel under evaluation is often used to generate a filtered value for the pixel under evaluation. To account for clipped pixels, a determination may be made as to whether any of the pixels (including the pixel under evaluation) in the neighborhood are identified as clipped. Clipped pixels may, in some embodiments, be identified at the time of the evaluation to generate the auto focus statistic or at a previously performed statistics collection unit (which may collect statistics or analyze the image for different purposes than auto focus statistics). If a clipped pixel is identified within the neighborhood of pixels, then the evaluation of the pixel may be excluded from the auto focus statistic.

There are some scenarios where clipped pixels may not indicate or cause misleading or inconsistent auto focus statistics. Low light scenarios, for example, may have clipped pixel values that are the sharper portions of an image. Therefore, in at least some embodiments, an image processing pipeline may provide auto focus statistics that are generated without excluding clipped pixels (instead of or in addition to generating auto focus statistics that are generated by excluding clipped pixels).

The techniques described herein for processing image data in an image processing pipeline that accounts for clipped pixels in auto focus statistics collection may be further illustrated in terms of an example system that employs them. As noted above, these techniques may be implemented in any type of camera, apparatus, or computing system that includes the capability to capture and process image data, including video clips.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes image sensor(s) 102, a system-on-a chip (SOC) component 104, system memory (e.g., DRAM) 130, persistent storage (e.g., flash memory) 128, and a display 116 (e.g., LCD). In this example, image sensor(s) 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images or video clips (which may be provided as output from image signal processor 106). Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 or SOC component 104 may include more or fewer elements than those shown in FIG. 1.

In various embodiments, SOC component 104 may be a uniprocessor system including one processor, or a multiprocessor system including several processors (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, ARM™, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. For example, video or other image data may be received from other devices (e.g., a content provider network or another mobile computing device) via network interface 110 and be stored in system memory 130 for subsequent processing (e.g., via a back-end interface to image signal processor 106, such as discussed below in FIG. 3) and display. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 130 may be executed by CPU 108 or GPU 120 to provide various functions of system 100.

In other embodiments, various functions may be performed by software components executing in memory on another device and communicating with the illustrated system via inter-computer communication. Some or all of these software components or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
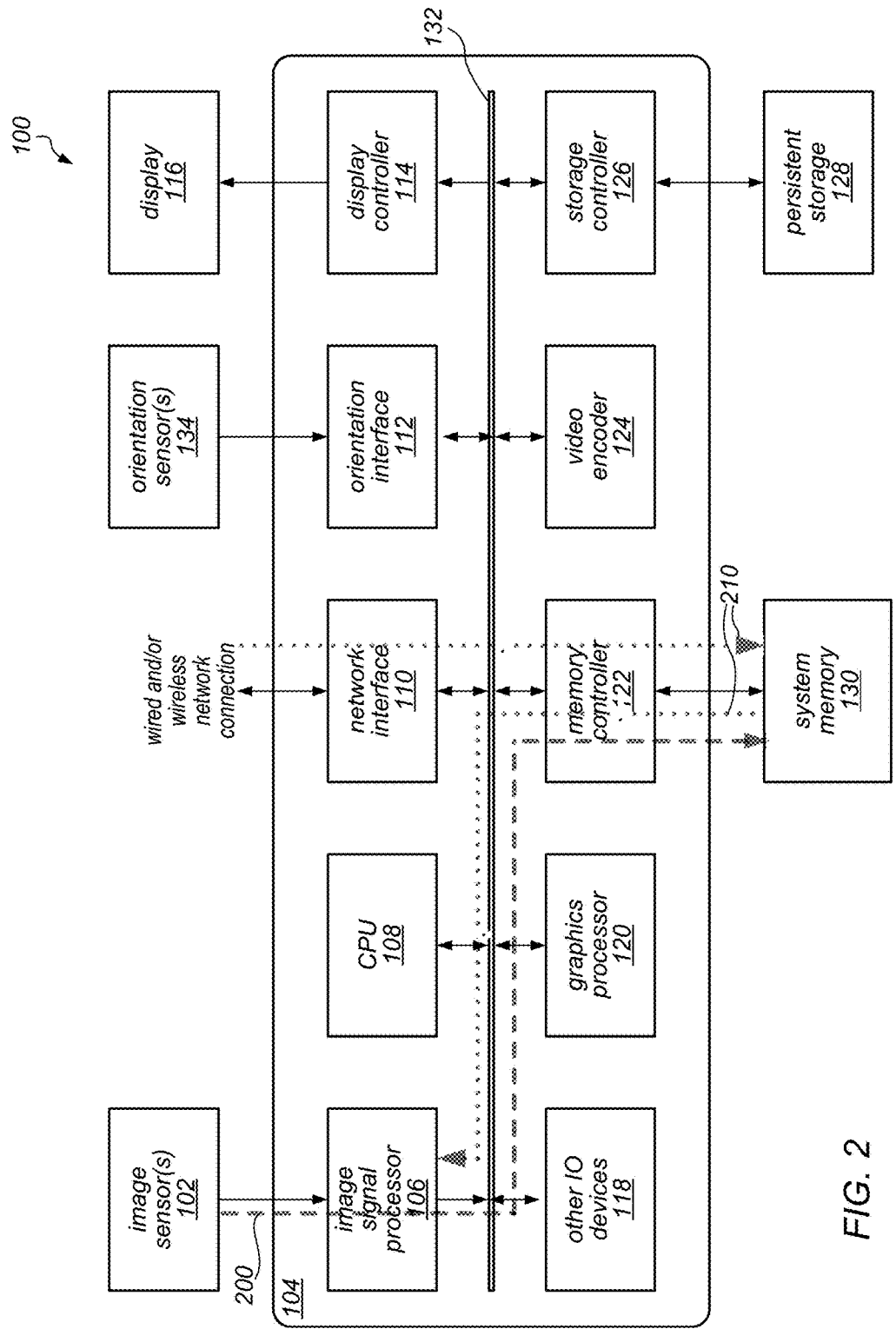
FIG. 2 is a logical block diagram illustrating example data paths in a system that may implement an image processing pipeline that processes image data, according to some embodiments.

FIG. 2 is a block diagram illustrating data paths in a system that implements an image signal processor (specifically, in system 100 illustrated in FIG. 1), according to some embodiments. As illustrated by the dashed lines in one example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

Another example data path is illustrated by the dotted lines 210. Image data, such as video image or data or image stills or frames, may be received system 100 from sources other than the image sensor(s) 102. For example, video data may be streamed, downloaded, or otherwise communicated to the system 100 via wired or wireless network connections from other sources remote to system 100 (e.g., a content provider network or other mobile computing device). The image data may be received via network interface 110 and written to memory 130 via memory controller 122. The image data may then be obtained by image signal processor 106 from memory 130 and processed through one or more image processing pipeline stages, in some embodiments, to perform various image correction, translation, conversion, or other image processing techniques. The image data may then be returned to memory 130, video encoder 124, or other component such as display controller 113 for display at display 116 or to storage controller 126 for storage at persistent storage 128 (not illustrated).

In some embodiments graphics processor 120 may access, manipulate, transform or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, or display controller 114) without storing the image data to system memory 130.
In One embodiment of an image signal processing unit (ISP), such as image signal processor 106, is illustrated by the block diagram in FIG. 3. As illustrated in this example, ISP 106 may in various embodiments be coupled to image sensor(s) 102 (from which it receives image data). In this example, ISP 106 implements an image processing pipeline which may include a set of stages that process image information from creation, capture, or receipt to output. For example, the various elements illustrated as components of ISP 106 process source data received from image sensor 102 through sensor interface(s) 302 into image data processable by other stages in the pipeline (e.g., image statistics 304, raw image processing 306, resample processing stage 308, noise processing stage 310, color processing stage 312, or output rescale 314), by other components of a system that includes ISP 106 via output interface 316 (including those that access the transformed data from the system memory after it is written to the system memory via memory controller interface 122 or are provided the image data via interconnect 132 directly) or back-end interface 342, or by other devices coupled to the system that includes ISP 106. In at least some embodiments, sensor interface(s) 302 may perform various preprocessing operations, such as pixel defect correction to detect and correct patterned defects and defect line pairs (e.g., created by special pixels like focus pixels), and image cropping or binning to reduce image data size. Note that in some embodiments, the image signal processor 106 is a streaming device. In other words, pixels may be received by the image signal processor 106 from the image sensor 102 via sensor interface(s) 302 in raster order (i.e., horizontally, line by line) and may in general be processed through its various pipeline stages in raster order, until finally being output in raster order.

Image signal processor 106 may process image data received at image signal processor (sometimes referred to as an ISP) at different rates. For example, in the example embodiment illustrated in FIG. 3, image signal processor may implement one or more front-end pipeline stages 330, such as raw processing stage 306 and resample processing stage 308, which process image data at an initial rate. Thus, the various different techniques, adjustments, modifications, or other processing operations performed at these front-end pipeline stages (such as those described below with respect to raw processing stage 306 and resample processing stage 308) may be implemented so that the image data may be continuously processed through these stages at the initial rate. For example, if the front-end pipeline stages 330 process 2 pixels per clock cycle, then raw processing stage 306 operations like black level compensation, highlight recovery, defective pixel correction, and others, may process 2 pixels of image data at a time.

Figure 3:
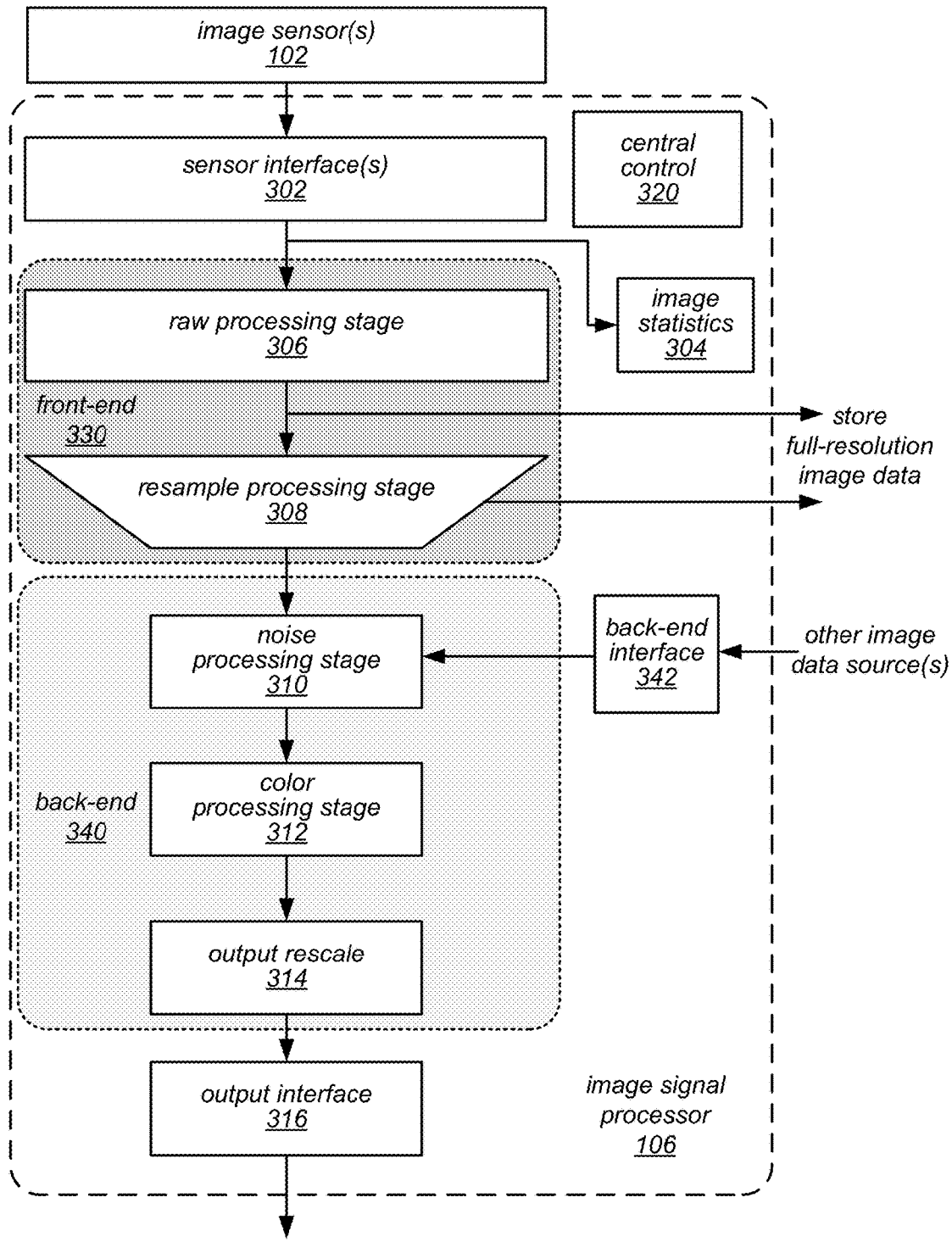
FIG. 3 is a logical block diagram illustrating an example image signal processor, according to some embodiments.

In addition to processing the image data at front-end pipeline stages at an initial rate, image signal processor 106 may implement one or more back-end pipeline stages that process image data a different rate. The back-end pipeline stages 340 may, in various embodiments, process image data at a reduced rate that is less than the initial data rate. For example, as illustrated in FIG. 3, back-end pipeline stages 340, such as noise processing stage 310, color processing stage 312, and output rescale 314, may be implemented so that the image data is processed according to the reduced rate. Given the above example of front-end stages 330 processing image data at 2 ppc, then noise processing stage 310 may implement operations such as temporal filtering and luma sharpening to process image data at a rate less than 2 ppc, such as 1 ppc.

In at least some embodiments, image signal processor 106 may implement back-end interface 342. Back-end interface 342 may receive image data from other image sources than image sensor(s) 102. For instance, as illustrated in FIG. 2, image data received over a wireless connection may be received and stored in memory 130. The image data may be received through back-end interface 342 for processing at back-end stages 340 of image signal processor 106. In this way, image signal processor 106 can be configured to provide resource efficient image processing capacity to data received from other image data source(s) instead of (or in addition to) CPU or GPU processing performed on the image data. In various embodiments, back-end interface 342 may convert image data to a format that is utilized by back-end processing stages. For instance, back-end interface 342 may convert RGB, YCbCr 4:2:0, or YCbCr 4:2:2 formatted image data into YCbCr 4:4:4 color format. Please note that back-end interface 342, as discussed below with regard to FIG. 6, may convert from various color formats, and thus the previous examples are not intended to be limiting.

In various embodiments, image signal processor 106 may implement central control module 320. Central control module 320 may configure and start the processing of image data, in some embodiments. For example, central control module 320 may implement performance monitors for logging clock cycles, memory latency, quality of service, and state information. Central control module 320 may update or manage control parameters for units, modules, stages, or other components of ISP 106, and may interface with sensor interface 302 to control the starting and stopping of the of the units, modules, stages, or other components. For example, in some embodiments, a unit, module, stage, or other component may go into an idle state during which programmable parameters may be updated by central control module 320. The unit, module, stage, or other component may then be placed into a run state, to perform one or more operations or tasks. In other examples, central control module 320 may configure image signal processor 106 to store image data (e.g., to be written to a memory, such as memory 130 in FIG. 2) before, during, or after resample processing stage 308. In this way full-resolution image data whether in raw or full-color domain format may be stored in addition to or instead of processing the image data output from resample processing stage 308 through backend pipeline stages.

In various embodiments, image signal processor 106 may implement image statistics module(s) 304. Image statistics module(s) 304 may perform various functions and collect information. For example image statistics module may, in some embodiments may perform sensor linearization, defective pixel replacement, black level compensation, lens shading correction, and inverse black level compensation in order to collect image information as a result of the various operations. When performing these different techniques, clipped pixels (a pixel that exceeds a clipped threshold according to some value, channel, component or other characteristic of the pixel) may identified, tracked, and maintained in tracking data for pixels of an image frame. For instance, an index, mapping, or other set of tracking data may be maintained in a memory, such as system memory 130 in FIGS. 1 and 2, that indicates which pixels have clipped at a technique, component, or unit within image statistics 304. Note that pixels may be clipped for the purposes of one technique (e.g., sensor linearization), and not for another technique, such as lens shading correction. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting. In some embodiments, evaluation of pixels values may be excluded from statistics collections, such as from AF statistics, when the statistics operations like sensor linearization, defective pixel replacement, black level compensation, lens shading correction, and inverse black level compensation identify clipped pixels within a neighborhood pixels evaluated for the pixel under evaluation (as may be indicated in the tracking data noted above). In scenarios where multiple image statistics modules 304 are implemented, each statistic module may be programmed by central control module 320 to collect different information for the same image data, or different image data collected for different images (e.g., collected from different ones of image sensor(s) 102).

As noted above, image signal processor 106 may implement one or multiple front-end pipeline stages, such as raw processing stage 306 and resample processing stage 308, which may process image data in raw or full-color domains. Raw processing stage 306 may, in various embodiments implement a variety of modules, units, or components to perform various operations, functions, or tasks on raw image data. Bayer raw format, for example, may be image data from collected from image sensor(s) 102 that implement a Bayer pattern of pixel sensors. For instance, some pixel sensors only capture green light, while other sensors capture red or blue light in Bayer pattern of sensors. In this way, image data in Bayer raw image format (or other raw image format captured by a color filter array in an image sensor) provides pixel data with values specific to a particular color (instead of all colors).

Raw processing stage 306 may thus process image data in a raw format (such as Bayer raw format) applying various operations including, but not limited to, sensor linearization, black level compensation, fixed pattern noise reduction, defective pixel correction, raw noise filtering, lens shading correction, white balance gain, and highlight recovery. A sensor linearization unit may, in some embodiments, map non-linear image data to linear space for other processing (e.g., to convert image data from a companding format collected from a High Dynamic Range (HDR) image sensor which may be one of image sensor(s) 102). Black level compensation may, in some embodiments, be performed to provide digital gain, offset and clip independently for each color component (e.g., Gr, R, B, Gb) on the pixels image data (which may occur after sensor linearization). In some embodiments, fixed pattern noise reduction may be performed to remove offset fixed pattern noise and gain fixed pattern noise by subtracting a dark frame from an input image and multiplying different gains to pixels, in some embodiments. Defective pixel correction may determine or identify defective pixels, and may replace defective pixel values, in various embodiments. Raw noise filtering may reduce noise of image data, in various embodiments, by averaging neighbor pixels that are similar in brightness. Highlight recovery may, in various embodiments, estimate pixel values for those pixels that are clipped (or nearly clipped) from other channels. Lens shading correction may apply a gain per pixel to compensate for a dropoff in intensity roughly proportional to a distance from a lens optical center. White balance gains may provide digital gains for white balance, offset and clip independently for all color components (e.g., Gr, R, B, Gb in Bayer format). Please note that various examples and descriptions provided above are not intended to be limiting as to the various techniques, components, or formats of raw processing stage 306 but are instead merely provided as examples. Various components, units, or modules may be broken apart into multiple different pipeline processing stages. Also note that in some embodiments, various ones of the components, units, or modules may convert raw image data into full-color domain, and thus raw processing stage 306 may, at various portions, process image data in the full-color domain in addition to or instead of raw image data. For instance, a simple demosaic unit may receive data from raw noise filtering and interpolate a full-color domain for raw image data to perform lens shading correction, white balance gain, or highlight recovery before converting the image data back to a raw image format.

In various embodiments, image signal processor 106 may implement resample processing stage 308. Resample processing stage 308 may perform various operations to convert, resample, or scale image data received from raw processing stage 306, as discussed in further detail below with regard to FIG. 4, and may provide as output image data according to a reduced rate such as may be implemented a back-end pipeline stages 340. Please note, that in some embodiments, some or all of the portions of resample processing stage may be implemented as part of raw processing stage and thus the previous description is provided as an example pipeline stages in an image processing pipeline which may implement multi-rate processing for image data.

In various embodiments, image signal processor 106 may implement one or more back-end pipeline stages 340 to process image data at rate that is less than the initial rate for processing image data in front-end stages 330 (e.g., 4 ppc initial rate >3, 2, or 1 ppc reduced rate). In at least some embodiments, back-end pipeline stages 340 may process image data according to a particular full-color format (e.g., YCbCr 4:4:4 or RGB) in which resample processing stage 308 or back-end interface 342 may provide to back-end stages 340. Please note, that in some embodiments, various ones of the back-end stages 340 may be configured to convert image data to the particular full-color format (or may utilize different full-color formats for processing), and thus the previous example is not intended to be limiting.

Image signal processor 106 may implement noise processing stage 310, in some embodiments. Noise processing stage 310 may, in various embodiments implement a variety of modules, units, or components to perform various operations, functions, or tasks, in different orders, such as gamma/de-gamma mapping, color space conversion, temporal filtering, noise filtering, luma sharpening, and chroma noise reduction. Color space conversion may convert image data to another color format or space (e.g., RBG to YCbCr). Gamma mapping may provide non-linear mapping functions for particular color channels of pixel data (e.g., Y, Cb, and Cr channels) in order to apply different image effects, including, but not limited to, black and white conversion, sepia tone conversion, negative conversion, or solarize conversion). Temporal filtering may be performed, in various embodiments, to filter image signal noise based on pixel values from a previously filtered image frame. Pixel values from the previously filtered image frame (which may be referred to herein as the reference image frame), may be combined with pixel values of a current image frame to get a best estimate of the pixel values. For example, a temporal filter may average the pixel values in the current image frame and the corresponding pixels in the reference image frame when the current image frame and the reference image frame are similar. In at least some embodiments, temporal filtering may be performed upon individual color channel values. For instance, a temporal filter may filter Y color channel values (from image data in YCbCr format) with Y color channel values in the reference frame (without filtering on other channels like Cb or Cr).

Other noise filtering, such as spatial noise filtering may be performed. In at least some embodiments, luma sharpening and chroma suppression may be performed to as part of spatial noise filtering in simultaneous or near simultaneous fashion. Luma sharpening may sharpen luma values of pixel data, in some embodiments. Chroma suppression may attenuate chroma to gray (i.e. no color), in some embodiments. The aggressiveness of noise filtering may be determined differently for different regions of an image, in some embodiments. Spatial noise filtering may be included as part of a temporal loop implementing temporal filtering as discussed above. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame). Please note that various examples and descriptions provided above are not intended to be limiting as to the various techniques or components implemented as part of noise processing stage 310, but are instead merely provided as examples.

Image signal processor 106 may implement color processing stage 312, in some embodiments. Color processing stage 312 may, in various embodiments implement a variety of modules, units, or components to perform various operations, functions, or tasks, in different orders, such as local tone mapping, gain/offset/clip, color correction, three-dimensional color lookup, gamma conversion, and color space conversion. Local tone mapping may, in some embodiments, apply spatially varying local tone curves in order to provide more control when rendering an image. For instance, a two-dimensional grid of tone curves (which may be programmed by the central control module 320) may be bilinearly interpolated such that smoothly varying tone curves are created across an image. In some embodiments, local tone mapping may apply spatially varying and intensity varying color correction matrices, which may, for example, be used to modify saturation or white balance across the image and according to brightness. Digital gain, offset and clip may be provided for each color channel or component of image data, in some embodiments. Color correction may be implemented, in some embodiments, applying a color correction transform matrix to image data. 3D color lookup may utilize a three dimensional array of color component output values (e.g., R, G, B) to perform advanced tone mapping, color space conversions, and other color transforms, in some embodiments. Gamma conversion may be performed, mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

In various embodiments, image signal processor 106 may implement output rescale module 314. Output rescale module 314 may resample, transform and correct distortion on the fly as the ISP 160 processes image data. Output rescale module 314 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may, in various embodiments, apply transforms to image data as it is processed at output rescale module 314. Output rescale module 314 may include horizontal and vertical scaling components. The vertical portion of the design may implement a series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may generate a best guess of where to center the vertical support window automatically. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

Note also that, in various embodiments, the functionally of units 302-342 may be performed in a different order than the order implied by the order of these functional units in the image processing pipeline illustrated in FIG. 3, or may be performed by different functional units than those illustrated in FIG. 3. Moreover, the various components, units, processes, or other functionalities described in FIG. 3 (or subsequent FIGS. 4-8) may be implemented in various combinations of hardware or software.

Figure 4:
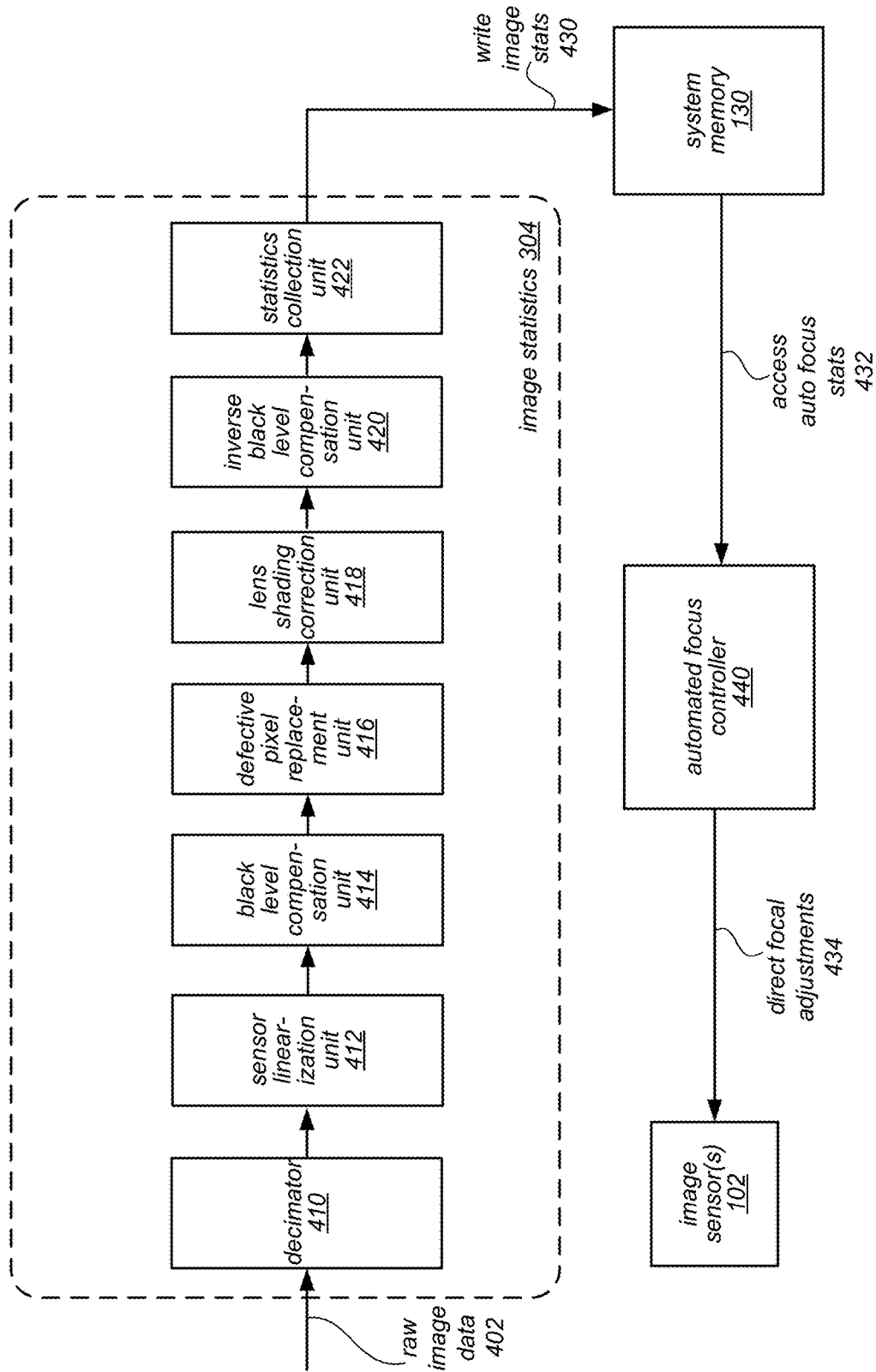
FIG. 4 is a logical block diagram illustrating an image statistics stage in an image signal processor, according to some embodiments.

The image signal processor may collect different statistics, in various embodiments, to modify the processing of image data or the collection of image data at the image sensor. For example, auto focus statistics may be collected in order to perform automated focal adjustments at an image sensor that provides image data to the image signal processor. FIG. 4 is a logical block diagram illustrating an image statistics stage in an image signal processor, according to some embodiments.

Raw image data 402 (as illustrated in FIG. 3) may be received from an image sensor as a stream of pixel data at image statistics 304. In some embodiments, image statistics 304 may implement decimator 410. Decimator 410 may perform down-sampling, in some embodiments, to reduce the image data processed by subsequent units in image statistics 304. For instance, decimator 410 may implement a horizontal binner followed by a vertical binner, which reduces the image data received in the horizontal and vertical directions. Image data may be received at an initial data rate, as discussed above with regard to FIG. 3, and decimator 410 may perform down-sampling of the image data according to the initial data rate. In at least some embodiments, the output of decimator 410 may be at a reduced rate so that other units within image statistics 304 may process the image data according to a reduced rate.

Decimator 410 may perform other operations, in some embodiments. For instance, decimator 410 may correct patterned pixels (e.g., focus pixels), such as by modifying pixel values to account for the defective performance. Decimator 410 may detect a clipped pixel according to a threshold (which may be particular to decimator 410) when down-sampling, and instead of outputting an averaged value (according to a down-sampling technique), decimator 410 may output the clipped pixel value. Decimator 410 may consider an output pixel clipped if any single or combination of input pixels are clipped, regardless of the output value possibly being under the clipped threshold. Decimator 410 may be configured to perform the above operations in various ways by central control 320 in FIG. 3. For instance, for one image frame, decimator 410 may be configured to perform down-sampling and output image data according to a reduced rate, whereas for another image frame, decimator 410 may be configured to bypass down-sampling, leaving the image data size unaltered, and output the image data at the input rate.

In some embodiments, image statistics 304 may implement multiple different units to simulate operations performed in the image processing pipeline, such as sensor linearization unit 412, black-level compensation unit 424, defective pixel replacement unit 416, lens shading correction unit 418, and inverse black level compensation unit 420 (which may perform operations similar those discussed above in raw processing stage 306 discussed above in FIG. 3). Sensor linearization unit 412, for instance, may map non-linear image data to linear space for other processing (e.g., to convert image data from a companding format collected from a High Dynamic Range (HDR) image sensor which may be one of image sensor(s) 102). Black level compensation unit 424 may, in some embodiments, be performed to provide digital gain, offset and clip independently for each color component of raw image data (e.g., Gr, R, B, Gb) on the pixels of image data (which may occur after sensor linearization). In some embodiments, defective pixel replacement unit 416 may determine or identify defective pixels, and may replace defective pixel values, in various embodiments. Lens shading correction unit 418 may apply gain to image data to compensate for a drop-off in intensity (which may be a result of the optics of the lens) roughly proportional to the distance from the lens optical center. Inverse black level compensation unit 420 may provide an inverse function to the changes performed on image data by black level compensation unit 414, in various embodiments.

Image statistics 304 may collect different types of statistics for many purposes. 3A statistics, discussed above, are examples of statistics which may be collected in image statistics 304. 3A statistics may include auto white balance (AWB), auto exposure (AE), and auto focus (AF). Statistics collection unit 422 may perform different operations to collect 3A statistics in hardware or software, which may be used to determine control parameters of lens (e.g. focal length), sensor (e.g. analog gains, integration time), and ISP (e.g. digital gains, CCM). For example, AWB operations may adjust color values so that that the lighting of an image does not alter the real-world color of objects captured in the image. Consider that pixel values captured for an image are related to the color temperature of the light source because objects reflect light sources. In scenarios where a white object is illuminated under a low color temperature, the white object will appear reddish in the captured image. Conversely, in other scenarios where the white object is illuminated under a high color temperature, the white object may appear bluish. Auto exposure operations may utilize statistics (e.g., image luminance statistics) to adjust pixel integration time and gains to control the luminance of the picture. Auto focus statistics may, in some embodiments, be collected, which FIG. 5 discusses in more detail below, to find the optimal focal length of the lens to bring an image in focus.

Image statistics, once generated, may be written 430 to system memory 130. Automated controls for the image sensor, the ISP, or other components may access the statistics to determine and direct adjustments. For example, an automated focus controller 440 (which may be implemented as part of an image sensor controller, or other application component or device at system 100 in FIGS. 1-2) may then access auto focus statistics 432 in system memory 130 in order to make focus determinations for image sensor(s) 102. For example, automated focus controller 440 may implement various search algorithms (e.g., global search, Fibonacci search, coarse-to-fine search, and rule-based search) that utilize auto focus statistics to determine a peak location within an image that indicates the sharpest location in the image (or region of an image as auto focus techniques may be performed on separate regions of an image). Focal adjustments may then be determined in order to maximize the sharpness of the peak location. Automated focus controller 440 may then direct 434 the determined focal adjustments to be performed at image sensor(s) 102. Automated focus controller 440 may be implemented in various combinations of hardware or software. For instance, in some embodiments, automated focus controller 440 may be a firmware executed by a processor. Please note that the previous example of auto focus techniques were provided as examples of techniques that may utilize collected auto focus statistics and are not intended to be limiting.

FIG. 4 is provided as merely an example of image statistics stage 304. Different combinations of the illustrated components (as well as components not illustrated) may be used to collect various statistics, identify clipped pixels, and perform various other operations on image data received at an image signal processor. For example, in some embodiments to image statistic stages may be implemented so that one stage may collect statistics for image data received for one portion of an image, while the other image statistics stage may collect statistics for another portion of the same image. Thus, the components of FIG. 4 and their respective layout or ordering is not intended to be limiting to the various other combinations which may be used to implement image statistics collection stage 304.

Figure 5:
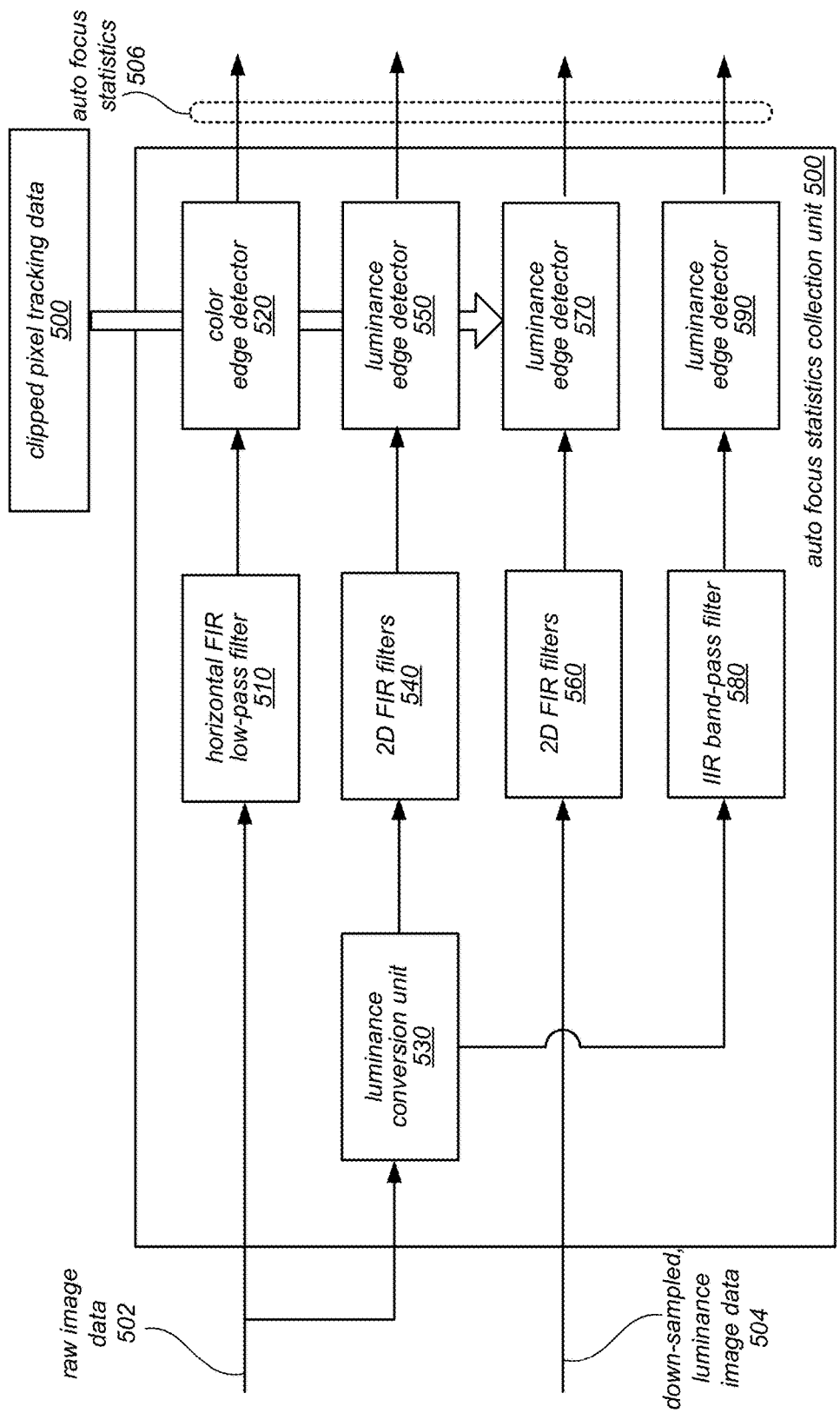
FIG. 5 is a logical block diagram illustrating an auto focus statistics collection unit, according to some embodiments.

As noted above, statistics collection unit 422 may generate multiple statistics, including multiple different auto focus statistics. FIG. 5 is a logical block diagram illustrating an auto focus statistics collection unit which may be implemented as part of statistics collection unit 422, according to some embodiments. Auto focus statistics collection unit 500 generates auto focus statistics that may be utilized separately or in combination to perform different auto focus techniques in different scenarios, such as low light or high light scenarios. In at least some embodiments, auto focus statistics may be generated for a portion of an image (or an entire image). For instance, edge count values may be determined for one portion of an image and the same statistic may be generated for another portion of the image. As illustrated in FIG. 5, raw image data 502 (e.g., a stream of pixel data) may be received for evaluation at auto focus statistics collection unit 500. Raw image data 502 may be received after processing through other units within image statistic's stage 304 (e.g., units 410-420 in FIG. 4) to simulate image data as it may be processed within other stages of the image processing pipeline (e.g., raw processing stage 306 in FIG. 3).

Raw image data 502 may, in various embodiments be evaluated to generate multiple different auto focus statistics. In some embodiments, auto focus statistics collection unit 500 may generate edge detection values for different color channels or components for image data. For example, auto focus statistics collection unit 500 may implement a horizontal finite input response (FIR) filter 510 to low-pass filter raw image data and subsequently an edge detector stage 520 that detects edges for the filter values generated by horizontal FIR low-pass filter 510. A horizontal FIR low-pass filter 510 may be configured to apply a low pass filter to raw image data 502 so that frequency data below a threshold may remain in the image data for color edge detector 520 to evaluate. Horizontal FIR filter 510 may also be configured to output high-pass or band-pass filtered data and thus detect edge values directly.

Color edge detector 520 may then update/generate an edge detection value based on the filtered value of the pixel. In some embodiments, color edge detector 520 may sum an edge value (which may be particular to an individual pixel based on the filtered value of the pixel) for each pixel the portion of the image for which the edge detection value is generated. Thus, as filtered values are received, the sum of edge values may be updated. When every pixel in the portion of the image is evaluated, the final sum of edge values may be the generated edge detection value (which may include respective values for individual color channels). In some embodiments, color edge detector 520 may generate the edge detection value by identifying the highest edge value for a row of pixels in the portion of the image and summing the highest edge value for each row in the portion of the image. Thus, as filtered values are received, the highest edge value for a row may be retained and added to the edge detection value until the pixels for each row have been evaluated (e.g., summing 10 highest edge values for a portion of the image that includes 10 rows of pixels).

Figure 6:
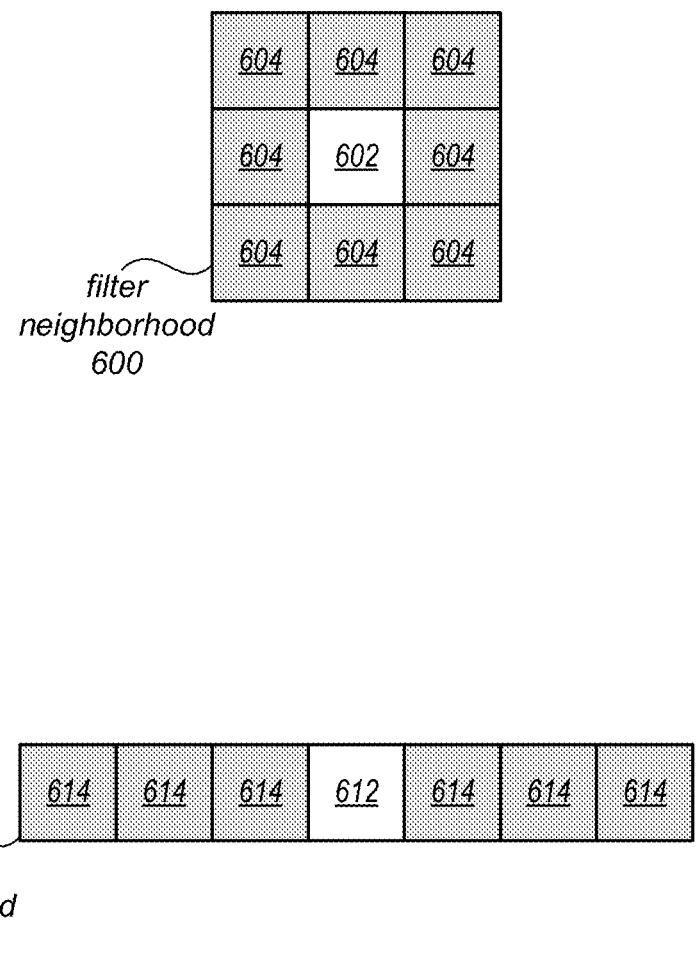
FIG. 6 illustrates example neighborhoods of pixels of a pixel under evaluation to generate an auto focus statistic, according to some embodiments.

Color edge detector 520 may exclude the results of horizontal FIR low-pass filter 510, in various embodiments, for a given pixel if a clipped pixel is detected within the neighborhood of pixels under evaluation at horizontal FIR band-pass filter 510. For instance, filter neighborhood 610 in FIG. 6 is illustrates an example filter neighborhood for a horizontal filter. Pixel 612 may be the pixel under evaluation (for which a filtered value is being generated) and pixels 614 may be pixels whose values are provided by filter taps (e.g., from memory) for pixels neighboring the pixel under evaluation and are used to generate the filtered value of pixel 612. If one of pixels 614 or pixel 612 is identified as a clipped pixel, then the output of horizontal FIR band-pass filter 510 may not be included in the edge detection value for the color channel (e.g., not included in the sum of edges for red or as a potential maximum edge value for blue in a row).

Color edge detector 520 may detect clipped pixels based on an evaluation of the pixel under evaluation (e.g., pixel 612) by comparing the pixel to a clipped pixel threshold for color edge detector 520. For instance, if the value of a red pixel exceeds a red clipped pixel threshold, then color edge detector 510 may identify the pixel as clipped. As illustrated in FIG. 5, clipped pixel tracking data 500 may be accessed to determine if pixels within a neighborhood (e.g., pixel 612 and pixels 614) were identified as clipped at a previous processing unit prior to image statistics collection (e.g., units 410-420 in FIG. 4). Clipped pixel tracking data 500 may be data that is maintained and updated when previous processing stages are processing pixels. For instance, if lens shading correction unit 418 identifies a pixel as above shading correction threshold, then tracking data for the pixel may be updated to indicate that the pixel has clipped. Some pixels may be considered clipped when evaluated at some units and not at other units. Clipped pixel tracking data 500 may indicate that a pixel is clipped for purposes of excluding the evaluation of a given pixel for auto focus statistics even if the most recent evaluation of a pixel does not consider the pixel to be clipped. Note, that in some embodiments, other processing units (e.g., units for other types of statistics collected for an image) may determine that a pixel is clipped and may update clipped pixel tracking data 500.

In at least some embodiments, auto focus statistics collection unit 500 may generate another auto focus statistic based on raw image data 502. As illustrated in FIG. 5, raw image data 502 may be received at luminance conversion unit 530. Luminance conversion unit 530 may receive as input a stream of raw pixel data (e.g., in Bayer format) and convert the raw image data into a stream of luminance values for the pixel data (e.g., by applying programmable coefficients to the different color channel pixels, red, blue, green). Luminance conversion unit 530 may provide the converted luminance image data to two-dimensional FIR filter 540. Luminance conversion unit 530 may mark output values as clipped if any one or more input channels are considered clipped, even if the output value itself is not clipped.

2D FIR filters 540 may apply one or more spatial filters to the luminance values to generate filtered values for generating an edge detection value at luminance edge detector 550. For example 2D FIR filters 540 may apply two programmable 3×3 filters to the luminance values to generate filtered values for a pixel. These filtered values may be edge values for the pixel which may be provided to luminance edge detector 550. Luminance edge detector 550 may generate an edge detection value for a portion of the image based on the edge values received for pixels. For example, luminance edge detector 550 may sum the filtered values for each pixel in the portion of the image for which the edge detection value is generated, in some embodiments. Thus, as filtered values are received, the sum of filtered values may be updated. When every pixel in the portion of the image is evaluated, the final sum of filtered values may be the generated luminance edge detection value. In some embodiments, luminance edge detector 550 may generate the edge detection value by identifying the highest filtered values associated with a particular pixel in a row of pixels in the portion of the image and summing the highest filtered values that are identified for each row in the portion of the image. Thus, as filtered values are received, the highest filtered values for a row may be retained and added to the sum until the pixels for each row have been evaluated.

As discussed above with regard to color edge detector 520, luminance edge detector 550 may exclude the results of 2D FIR filters 540, in various embodiments, for a given pixel if a clipped pixel is detected within the neighborhood of pixels under evaluation at 2D FIR filters 540. For instance, filter neighborhood 600 in FIG. 6 illustrates an example filter neighborhood for a spatial filter. Pixel 602 may be the pixel under evaluation (for which a filtered value is being generated) and pixels 604 may be pixels whose values are provided by filter taps (e.g., from memory) for pixels neighboring the pixel under evaluation and are used to generate the filtered value of pixel 602. If one of pixels 604 or pixel 602 is identified as a clipped pixel, then the output of 2D FIR filters may not be included in the luminance edge detection value.

Luminance edge detector 550 may detect clipped pixels based on an evaluation of the pixel under evaluation (e.g., pixel 602) by comparing the pixel to a clipped pixel threshold for luminance edge detector 550. In some embodiments, clipped pixel tracking data 500 may be accessed to determine if pixels within a neighborhood (e.g., pixel 602 and pixels 604) were identified as clipped at a previous processing unit prior to image statistics collection (e.g., units 410-420 in FIG. 4).

In at least some embodiments, auto focus statistics collection unit 500 may generate another auto focus statistic based on down-sampled luminance image data. As illustrated in FIG. 5, down-sampled luminance image data 504 may be received at auto-focus statistics collection unit. In at least some embodiments, other statistics collection units or processing units in the image statistics stage 304 may down-sample raw image data, such as raw image data 502. For instance, 4×4 averaging may be performed, which averages the green pixel values in the 4×4 area, the red pixel values in the 4×4 area, and the blue pixel values in the 4×4 area to down sample the raw image data. The down-sampled image data may also be converted from a raw format to a full color domain which includes a luminance component, in some embodiments. For example, Bayer format image data may be converted into a YCrCb format. The luminance component of the down-sampled and converted image data may then be provided to 2D FIR filters 560 as down-sampled luminance image data 504. A down-sampled luminance value may be marked as clipped if any single, or more, of the input pixels (16 in the 4×4 example above) are considered clipped.

2D FIR filters 560 may apply one or more spatial filters to the luminance values of down-sampled luminance image data 504 to generate filtered values for generating an edge detection value at luminance edge detector 570. For example 2D FIR filters 540 may apply programmable 2 3×3 filters to the luminance values to generate filtered values for a pixel. These filtered values may be edge values for the pixel which may be provided to luminance edge detector 570. Luminance edge detector 570 may generate an edge detection value for a portion of the image based on the edge values received for pixels. For example, luminance edge detector 570 may sum the filtered values for each pixel in the portion of the image for which the filtered values are generated, in some embodiments. Thus, as filtered values are received, the sum of filtered values may be updated. When every pixel in the portion of the image is evaluated, the final sum of filtered values may be the generated luminance edge detection value. In some embodiments, luminance edge detector 570 may generate the edge detection value by identifying the highest filtered values associated with a particular pixel in a row of pixels in the portion of the image and summing the highest filtered values that are identified for each row in the portion of the image. Thus, as filtered values are received, the highest filtered values for a row may be retained and added to the sum until the pixels for each row have been evaluated.

Similar to color edge detector 520 and luminance edge detector 550, luminance edge detector 570 may exclude the results of 2D FIR filters 560, in various embodiments, for a given pixel if a clipped pixel is detected within the neighborhood of pixels under evaluation at 2D FIR filters 560. Luminance edge detector 570 may detect clipped pixels based on an evaluation of the pixel under evaluation (e.g., pixel 602 in neighborhood 600 in FIG. 6) by comparing the pixel to a clipped pixel threshold for luminance edge detector 570. In some embodiments, clipped pixel tracking data 500 may be accessed to determine if pixels within a neighborhood (e.g., pixel 602 and pixels 604) were identified as clipped at a previous processing unit prior to image statistics collection (e.g., units 410-420 in FIG. 4).

In at least some embodiments, clipped pixels may not result in excluded evaluations for an auto focus statistics. For example, in FIG. 5, the output of luminance conversion unit 530 may be provided to infinite impulse response (IIR) band-pass filter 580 and to luminance edge detector 590, which may not exclude the evaluations of pixels that include a clipped pixel in a neighborhood of evaluated pixels. IIR band-pass filter 580 may filter image data received from luminance conversion unit 530 such that frequencies above an upper threshold and below a lower threshold are attenuated. The remaining frequencies may be utilized to generate an edge value for an input pixel. In some embodiments, IIR band-pass filter 580 may be implemented as a horizontal IIR and/or a vertical IIR filter.

Luminance edge detector 590 may generate an edge detection value for a portion of the image based on the edge values received for pixels from IIR band-pass filter 580. For example, luminance edge detector 590 may sum the edge value for each pixel in the portion of the image for which the edge detection value is generated, in some embodiments. Thus, as edge values are received, the sum of edge values may be updated. When every pixel in the portion of the image is evaluated, the final sum of edge values may be the generated luminance edge detection value. In some embodiments, luminance edge detector 590 may generate the edge detection value by identifying the highest edge value associated with a particular pixel in a row of pixels in the portion of the image and summing the highest edge values that are identified for each row in the portion of the image. Thus, as edge values are received, the highest edge value for a row may be retained and added to the sum until the pixels for each row have been evaluated.

Figure 7:
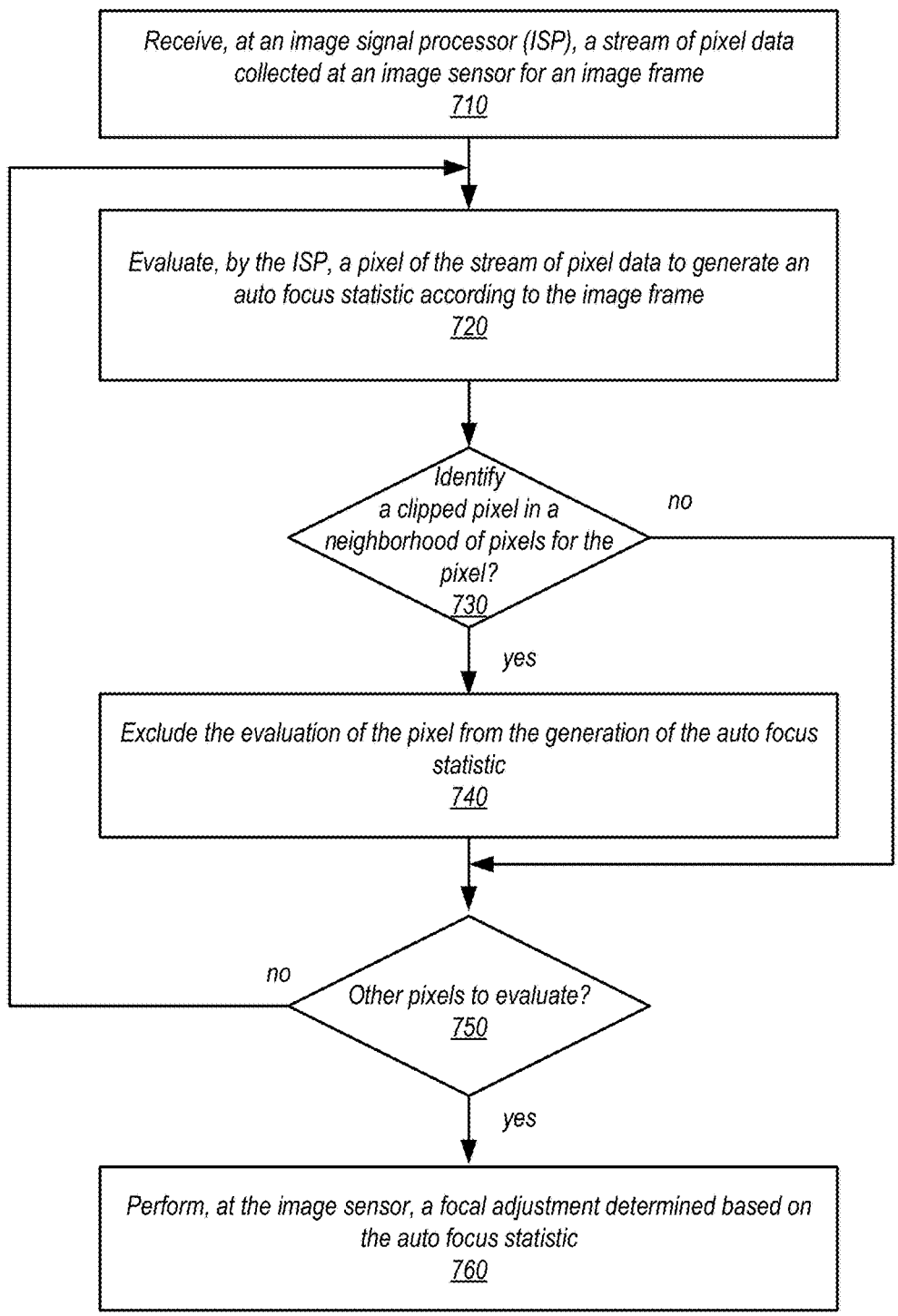
FIG. 7 is a high-level flowchart illustrating various methods and techniques that account for clipped pixels in auto focus statistics collection, according to some embodiments.

FIGS. 1-6 provide an example of an image processing pipeline, image signal processor, and system which may account for clipped pixels in auto focus statistics. However, numerous other types or configurations of systems or devices that implement an image processing pipeline and image signal processor that collects auto focus statistics may account for clipped pixels. FIG. 7 is a high-level flowchart illustrating various methods and techniques that account for clipped pixels in auto focus statistics collection, according to some embodiments. The various components described above may implement these techniques (in addition to those described with regard to FIG. 8 below) as well as various other image processing pipelines and image signal processors.

As indicated at 710, a stream of pixel data collected from an image sensor may be received at an image signal processor (ISP). Pixel data may be captured and processed in streaming fashion as it is collected at an image sensor. In at least some embodiments, the stream of pixel data may be in raw format which, as discussed above, may be formatted such that multiple color components or channels are not included for an individual pixel. One example of raw image data is a Bayer image format (of which there may be many variations) that includes different rows of pixel values for collecting light in different colors, green, red, and blue, which depend on the configuration of the image sensor. These pixel values (e.g., green values, red values, or blue values) may be collected and provided in raster order to the image signal processor, in some embodiments.

Auto focus statistics may be statistics which indicate or characterize the focus of an image. Auto focus statistics may be generated for an entire image or one or more portions of an image (which may sometimes be referred to as regions, windows, or tiles). In generating an auto focus statistic, pixels of the stream of pixel data may be individually evaluated. In at least some embodiments, a neighborhood of pixels for the pixel may be utilized when evaluating the pixel, such as neighborhoods 600 and 610 discussed above with regard to FIG. 6. Each of these pixels in the neighborhood may have had their own neighborhood for their computation in earlier stages of the statistics processing pipeline where they may have been marked as clipped. Consider the examples discussed above with regard to FIG. 5. Spatial filters or horizontal filters may be applied to an input pixel based on a respective neighborhood of pixels in order to generate a filtered value (or multiple filtered values). The filtered value may then be used to determine an edge value for the input pixel which may be used in various ways to generate an edge detection value as the auto focus statistic (e.g., by summing the edge values for every pixel or by summing the highest edge value of pixels in a row for each row) as part of generating the auto focus statistic. Thus, as indicated at 720, a pixel of the stream of pixel data may be evaluated to generate an auto focus statistic according to the image frame.

Clipped pixels may be identified within the neighborhood of pixels for the pixel, as indicated at 730. As clipped pixels may cause misleading or inconsistent auto focus statistics, in some scenarios, if a clipped pixel is identified (as indicated by the positive exit from 730, then the evaluation of the pixel may be excluded from the generation of the auto focus statistic (e.g., the filter value may be ignored and not added to a sum value or be considered as a highest value), as indicated at 740. Clipped pixels may be identified by comparing a value of the pixel to a threshold, which if exceeded indicates that the pixel is clipped. In some embodiments, pixel tracking data may be maintained so that information indicating clipped pixels detected by previously performed image processing operations is retained.

As indicated at 750, the evaluation of pixels may be performed until all pixels are evaluated. For instance, the evaluation may continue until each pixel in a window, tile or other portion of an image frame for which the auto focus statistic is being generated has been evaluated. When completed, the generated auto focus statistic may be written or stored (e.g., to a memory).

As indicated at 760, a focal adjustment may be performed at the image sensor that was determined, at least in part, using the auto focus statistic. For example, various auto focus techniques search within an image frame for the sharpest portion of the image. Auto focus statistics may be used to aid the search for the sharpest portion of the image. Edge detection values, such as those discussed above may indicate contrasting objects within a portion of an image, which may indicate that a sharp portion of the image includes the contrasting objects. Focal adjustments may be determined (e.g., changing the focal length between a lens and sensor array in an image sensor) which will maximize the sharpest portion in order to make the sharpest portion as sharp as possible. Please note that the example auto focus technique described above is provided as an example and not intended to be limiting as to the various other ways in which auto focus techniques may be performed.

For some auto focus statistics, including clipped pixels may not skew the value of statistics for performing focal adjustments. Low light scenarios, for instance, may include clipped pixels that provide helpful information for determining where to focus an image sensor, as low-light images may exhibit a smaller signal-to-noise ratio than images captured in bright light conditions. Thus, in some embodiments, auto focus statistics may also be generated that do not exclude clipped pixels (utilizing the same image data as received for generating the auto focus statistics discussed in FIG. 7 above). In this way, automated image sensor controllers or other components may select the auto focus statistics that are appropriate for the particular scenario and make focal adjustments (without having to request the statistics or reconfigure an auto focus statistics collection unit to provide the different auto focus statistics.

Figure 8:
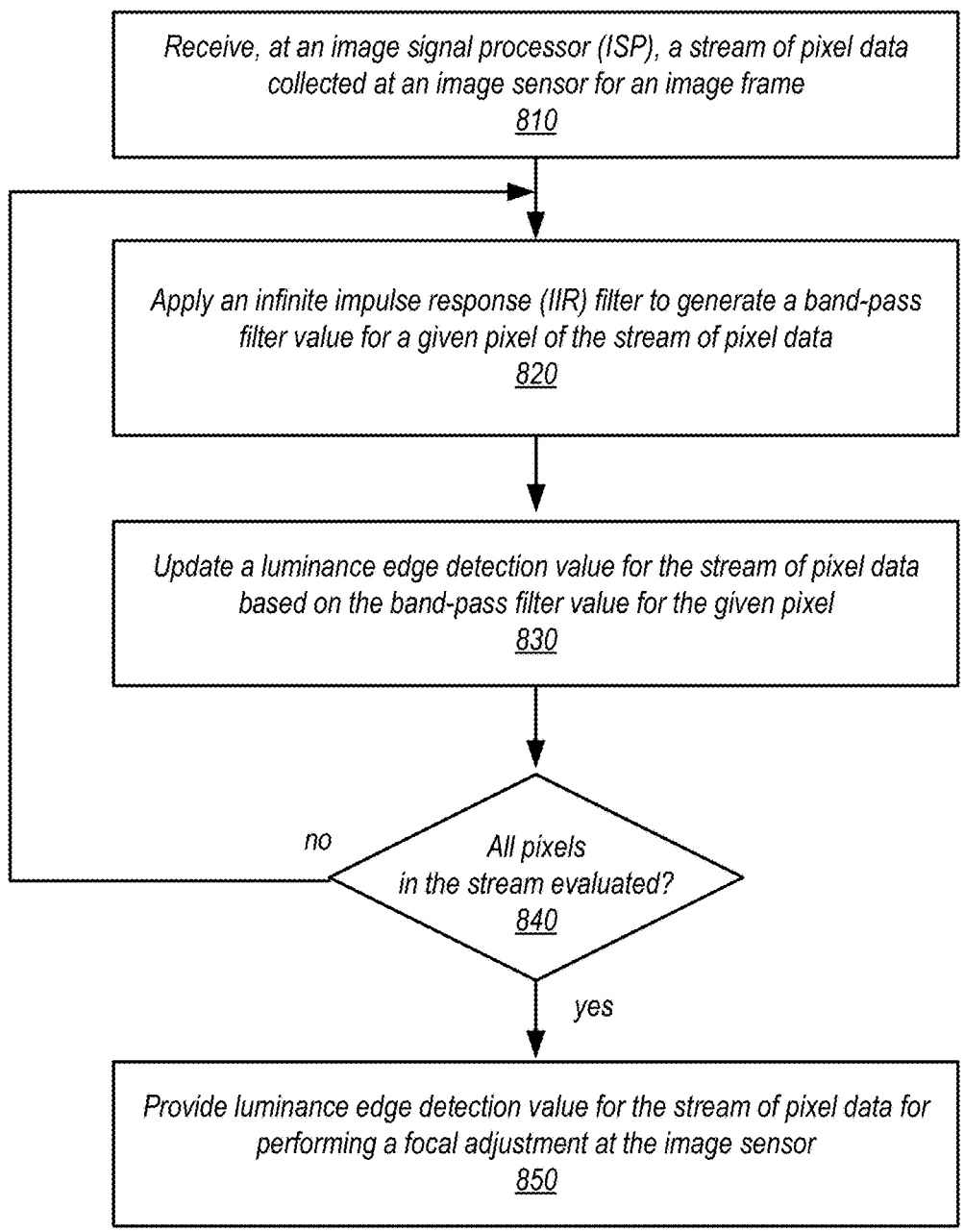
FIG. 8 is a high-level flowchart illustrating a technique to generate an auto focus statistic, applying an infinite impulse response filter to a stream of pixel data without excluding clipped pixels, according to some embodiments.

A luminance edge detection value is one example of an auto focus statistic that may be generated without excluding clipped pixels. A luminance edge detection value may provide an indication of the number of edges in a corresponding portion of an image based on luminance data for the portion of the image. FIG. 8 is a high-level flowchart illustrating a technique to generate an auto focus statistic, applying an infinite impulse response (IIR) filter to a stream of pixel data without excluding clipped pixels, according to some embodiments. As indicated at 810, a stream of pixel data collected from an image sensor may be received at an image signal processor (ISP). The stream of received pixel data may be the same stream of pixel data as received at element 710 in FIG. 7. As pixels in the stream of pixel data are received with respect to a portion of the image data for which the luminance edge detection value is being generated, the pixel may be evaluated. For instance, as indicated at 820 an IIR filter may be applied to generate a band-pass filter value for a given pixel. The IIR filter may be implemented as a vertical IIR filter and/or a horizontal IIR filter and may attenuate frequency data for the given pixel outside of a band (e.g., above an upper threshold and below a lower threshold). Consider a noisy image captured in a low light scenario. A band-pass filter applied to the image data for the image may isolate image data for determining an auto focus statistic that is more reliable for making focal adjustments than image data including a larger range of frequency data. For example, when high frequencies of image data are dominated by noise, focus may be better distinguished in mid to low frequencies of the image data. An IIR filter may also efficiently provide band-pass filtering capability when compared with other types of filter. For instance, a 2nd order Chebyshev type I IIR filter with a Nyquist normalized passband of [0.1, 0.2] may be more effective than an high-pass filter due to the IIR filter's inherently large support when compared with the high-pass filter.

A luminance edge detection value may then be updated according to the band-pass filter value for the given pixel, as indicated at 830. For instance, the luminance edge detection value may be generated by summing the edge values for every pixel or by summing the highest edge value of pixels in a row for each row. Additionally, even if the given pixel is clipped or a neighborhood pixel evaluated to apply the IIR filter is clipped, the filtered value may still be included in the update to the luminance edge detection value. Once all pixels in the stream of pixel are evaluated (e.g., for a given window, tile, or region of an image), then, as indicated by the positive exit from 840, the luminance edge detection value may be provided for performing a focal adjustment at the image sensor, as indicated at 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
   an image sensor that collects image data;
   an image signal processor, configured to:
      receive a stream of pixel data collected at the image sensor for an image frame;
      determine an edge detection value for the image frame, wherein to determine the edge detection value the image signal processor is configured to at least:
         evaluate respective neighborhoods of pixels for individual pixels in the stream of pixel data to determine the edge detection value; and
         for at least one of the individual pixels:
            detect a clipped pixel within the respective neighborhood; and
            exclude the evaluation of the at least one individual pixel from the edge detection value; and
      store the edge detection value in a memory; and
   an automated controller, configured to:
      access the memory to obtain the edge detection value; and
      direct a focal adjustment at the image sensor based, at least in part, on the edge detection value.

2. The apparatus of claim 1,
   wherein the stream of pixel data is received in a raw format; and
   wherein the image signal processor is further configured to:
      down-sample the stream of pixel data;
      perform the determination of the edge detection value to determine another edge detection value according to the down-sampled stream of pixel data; and
      output the other edge detection value.

3. The apparatus of claim 1, wherein the edge detection value is determined according to a luminance channel determined for the stream of pixel data, wherein the image signal processor is configured to perform the determination for different color channels of the stream of pixel data to determine other edge detection values corresponding to the different color channels.

4. The apparatus of claim 1, wherein to detect the clipped pixel, the image signal processor is configured to at least:
   compare the pixels of the respective neighborhoods of pixels to tracking data maintained for the stream of pixel data, wherein the tracking data indicates those pixels determined to be clipped at one or more image processing operations that process the stream of pixel data prior to the determination of the edge detection value; or
   compare the pixel of the respective neighborhoods of pixels to a clipped pixel threshold, wherein the clipped pixel exceeds the clipped pixel threshold.

5. The apparatus of claim 1, wherein the image signal processor is further configured to:
   determine another edge detection value, wherein the to determine the other edge detection value the image signal processor is configured to at least:
      apply an infinite impulse response (IIR) filter to generate respective band-pass filter values for pixels in the stream of pixel data;
      calculate the other edge detection value based on the band-pass filter values, wherein the calculation includes the band-pass filter values for clipped pixels in the stream of pixel data; and
   store the other edge detection value in the memory.

6. The apparatus of claim 5, wherein the IIR filter is a horizontal IIR filter.

7. The apparatus of claim 1, wherein the apparatus comprises a mobile computing device.

8. A method, comprising:
   receiving, at an image signal processor, a stream of pixel data collected at an image sensor for an image frame;
   evaluating, by the image signal processor, the stream of pixel data to generate an auto focus statistic according to the image frame, comprising:
      identifying a clipped pixel in the stream of pixel data within a neighborhood of pixels evaluated for a given pixel of the stream of pixel data; and
      excluding the evaluation of the neighborhood of pixels for the given pixel from the generation of the auto focus statistic; and
   performing, at the image sensor, a focal adjustment determined based on the auto focus statistic.

9. The method of claim 8, wherein excluding the evaluation of the neighborhood of pixels for the given pixel value comprises excluding output of a two-dimensional spatial filter applied to a luminance channel of the clipped pixel, wherein the neighborhood of the pixels corresponds to an area identified by a filter kernel applied by the two-dimensional spatial filter.

10. The method of claim 9, further comprising:
prior to evaluating the stream of pixel data, down-sampling the stream of pixel data such that the evaluated stream of pixel data is a down-sampled stream of pixel data.

11. The method of claim 8, wherein identifying the clipped pixel in the stream of pixel data comprises individually comparing the pixels of the neighborhood of pixels to a clipped pixel threshold, wherein the clipped pixel exceeds the clipped pixel threshold.

12. The method of claim 8, further comprising:
maintaining tracking data for pixels in the stream of pixel data that indicates pixels determined to be clipped pixels at one or more image processing operations that process the stream of pixels prior to generating the auto focus statistic; and
wherein identifying the clipped pixel in the stream of pixel data comprises accessing the tracking data for the pixels of the neighborhood of pixels.

13. The method of claim 8, further comprising:
generating, by the image signal processor, another auto focus statistic for the image frame, wherein the other auto focus statistic is a luminance channel edge detection value, wherein the generating comprises:
applying an infinite impulse response (IIR) filter to generate respective band-pass filter values for pixels in the stream of pixel data; and
calculating the luminance channel edge detection value based on the band-pass filter values, wherein the calculating includes the band-pass filter values for clipped pixels in the stream of pixel data; and
providing the luminance channel edge detection value to an automated controller for the image sensor, wherein the auto focus statistic is also provided to the automated controller, wherein the automated controller performs the focal adjustment at the image sensor.

14. The method of claim 13, wherein the IIR filter is a vertical IIR filter.

15. A system, comprising:
a device configured to perform image processing, the device comprising:
a sensor interface configured to receive image data from an image sensor; and
an image processing pipeline comprising an auto focus statistics collection unit, wherein the image processing pipeline is configured to:
receive via the sensor interface a stream of pixel data for an image frame collected at the image sensor;
generate, by the auto focus statistics collection unit, an auto focus statistic for the image frame, wherein to generate the auto focus statistic the auto focus statistics collection unit is configured to at least:
evaluate respective neighborhoods of pixels for individual pixels in the stream of pixel data;
for at least one of the individual pixels:
detect a clipped pixel within the respective neighborhood;
exclude the evaluation of the at least one individual pixel from the auto focus statistic; and
output the auto focus statistic.

16. The system of claim 15, wherein the stream of pixel data is in Bayer raw format comprising red, blue and green color components, wherein to evaluate the respective neighborhoods of pixels for the individual pixels in the stream of pixel data, the image signal processor is configured to apply a horizontal filter to the stream of pixel data to generate a respective version of the auto focus statistics for the red, blue and green color components.

17. The system of claim 15, wherein the image signal processor is further configured to:
down-sample the stream of pixel data;
perform the generation of the auto focus statistic to generate another auto focus statistic according to the down-sampled stream of pixel data;
output the other auto focus statistic.

18. The system of claim 15,
wherein the image signal processor further comprises a plurality of other statistic collection units;
wherein the image signal processor is further configured to track those pixels of the stream of pixel data identified as clipped at one or more of the plurality of other statistic collection units; and
wherein to detect the clipped pixel within the respective neighborhood, the image signal processor is configured to access tracking data for the pixels of the respective neighborhood.

19. The system of claim 15, wherein the auto focus statistics collection unit is further configured to:
generate, by the auto focus statistics collection unit, another auto focus statistic for the image frame, wherein to generate the other auto focus statistic the auto focus statistics collection unit is configured to at least:
apply an infinite impulse response (IIR) filter to generate respective band-pass filter values for pixels in the stream of pixel data;
calculate the other auto focus statistic based on the band-pass filter values; and
output the other auto focus statistic.

20. The system of claim 19, wherein the system further comprises the image sensor and an automated controller for the image sensor, wherein the automated controller is configured to:
obtain the auto focus statistic and the other auto focus statistic; and
based on the auto focus statistic or the other auto focus statistic, perform a focal adjustment at the image sensor.

* * * * *